United States Patent
Egetoft (10) Patent No.: US 8,682,871 B2
(45) Date of Patent: Mar. 25, 2014

(54) METHOD AND SYSTEM FOR IMPLEMENTING OBJECT-ORIENTED EXCEPTION HANDLING

(75) Inventor: Karsten Soegaard Egetoft, Walldorf (DE)

(73) Assignee: SAP AG, Walldorf (DE)

( * ) Notice: Subject to any disclaimer, the term of this patent is extended or adjusted under 35 U.S.C. 154(b) by 1168 days.

(21) Appl. No.: 12/273,129

(22) Filed: Nov. 18, 2008

(65) Prior Publication Data

US 2010/0125756 A1   May 20, 2010

(51) Int. Cl.
*G06F 17/30* (2006.01)

(52) U.S. Cl.
USPC .................. 707/694; 707/754; 707/758

(58) Field of Classification Search
USPC ........................................ 707/758, 770, 694
See application file for complete search history.

(56) References Cited

U.S. PATENT DOCUMENTS

2005/0262472 A1* 11/2005 Wood et al. .................. 717/102
2008/0104596 A1* 5/2008 Buonanno et al. ............ 718/101

OTHER PUBLICATIONS

Schiefer, Josef, and Andreas Seufert. "Management and controlling of time-sensitive business processes with sense & respond." Computational Intelligence for Modelling, Control and Automation, 2005 and International Conference on Intelligent Agents, Web Technologies and Internet Commerce, International Conference on. vol. 1. IEEE, 2005.*
Maheshwari, Piyush, and S. S. Tam. "Events-based exception handling in supply chain management using web services." Telecommunications, 2006. AICT-ICIW'06. International Conference on Internet and Web Applications and Services/Advanced International Conference on. IEEE, 2006.*

* cited by examiner

*Primary Examiner* — Usmaan Saeed
*Assistant Examiner* — Nan Hutton
(74) *Attorney, Agent, or Firm* — Kenyon & Kenyon LLP (57) ABSTRACT

A system, method, and computer-readable medium having instructions thereon for executing a method for providing object-oriented content-based exception handling in business software applications are provided. An embodiment provides for handling an exception based on both the context of a process step in a process chain of a business software application, as well as the specific content of the process. An embodiment includes the use of a database to associate content information with desired responses, in order to further automate exception handling. For those exceptions which cannot be handled in an automatic fashion, then manual intervention is requested.

18 Claims, 5 Drawing Sheets

Business Object Dependant Rules — 501

| | Sold to party | Total Weight | Total amount | Currency | Sales Channel | .... | |
|---|---|---|---|---|---|---|---|
| 502 (1) | | 0 - 10 | < 1000 | EUR | Letter/Fax | | Spec.Reac.Type 001 |
| 503 (2) | 5001 | < 100 | > 10.000 | EUR | Internet | | Spec.Reac.Type 002 |
| 504 (3) | 5+++ | | | | Call Center | | Spec.Reac.Type 003 |
| 505 (4) | 6000 - 7000 | | | | | | Spec.Reac.Type 004 |

METHOD AND SYSTEM FOR IMPLEMENTING OBJECT-ORIENTED EXCEPTION HANDLING

BACKGROUND

Business systems can involve a variety of software object-oriented business applications. Such business applications may involve various activities which occur on and through software objects, or business objects. Such activities themselves may be interlinked from a business point of view, and thus, bundled in a logical process chain. However, in the logical process chain, exceptions may occur. Existing systems do not appear to provide an adequate solution to resolving situations in which such exceptions occur in process chains. For example, in some existing systems, exception handling is oftentimes limited in flexibility, e.g., the exception handling is hardcoded in the business application. For example, when exception handling is hardcoded, often only one option/solution is hardcoded given the complexity which can be involved in hardcoding desired options for each exception which may be contemplated in advance. Accordingly, in existing systems, there is a lack of flexibility for a business user to change the process and/or to implement a specific reaction option or solution.

In some existing systems, the business application does not provide as transparent a system as a business user may need and/or want. For example, some existing systems do not offer a central overview of exception handling specifically provided for and/or the kinds of reactions offered in response to the respective exceptions. Accordingly, a need exists for a logical solution to resolving situations in which exceptions occur within a process chain business application. Further, a need exists for a logical solution to resolving such situations, and providing a business user with an overview of the exceptions which may be specifically handled, and the reactions available to the exceptions.

DETAILED DESCRIPTION

An embodiment of the present invention provides for a method, a system, and a computer-readable medium having instructions thereon for implementing a method for providing object-oriented content-based exception handling. Such an embodiment of the present invention provides for object-oriented content-based exception handling which is reusable with a variety of different business applications. For example, such business application may be a part of Enterprise Resources Planning, different industry solutions provided by legacy systems, as well as other systems. An embodiment of the present invention provides for object-oriented content-based exception handling which is flexible and/or adaptable due to its use of content dependent rules. An embodiment of the present invention provides for object-oriented content-based exception handling which is process-oriented due to use of customizing descriptions of end-to-end business processes.

An embodiment of the present invention provides for an automated exception handling, eliminating need for any manual or business user intervention. Such automation can provide cost savings and enhanced reaction time speed, thus providing an optimization of business processes and/or better service to customers.

An embodiment of the present invention provides for object-oriented content-based exception handling in a business application. For example, content and the context of a process where a specific exception occurred are analyzed. Through analyzing both content and context, a business application according to an embodiment of the present invention can differentiate between reaction types in a flexible way, and ensuring triggering of automated exception handling when possible.

An embodiment of the present invention provides for a transparent system in which a central overview of exceptions and associated reactions is accessible by a user. Accordingly, a user does not need to have intimate know-how of the business application in order to find out and/or understand the exceptions and reactions, e.g., automated reactions, offered in the application.

In an embodiment of the present invention, logic is provided to find and trigger a desired reaction to a specific exception within a process chain business application. For example, a company would like to use an ERP application to streamline the activity of receiving purchase orders from their customers, so that the application responds automatically to the purchase order whenever possible. The purchase orders may come from a variety of possible sales channels such as the Internet (B2B—business to business), a paper order (letter/facsimile/email/other), or a Call Center order (telephone/text message/video conference). Different reaction possibilities are available depending upon the channel via which the purchase order arrived. And, for those cases where no response (or reaction) can be generated, a manual workflow is commenced so that it can be later handled by a person. In order for a business application to ensure an adequate reaction to each exception, e.g., a response is automatically generated or a manual workflow is commenced, then the business activity of receiving an electronic purchase order must offer a flexible exception handling which is dependant on the content of the specific purchase order where the exception occurred. For example, here, the sales channel is a needed information when selecting the correct exception handling method as part of the automated process within the business application.

In the previous example, the purchase order may have been received in one of a variety of ways. For example, if the purchase order was received via the Internet, then an exception should trigger an electronic response to the appropriate business partner/customer according to an embodiment of the present invention. For example, if the purchase order was received via a paper-based media (letter/facsimile/other), then an exception should trigger a printout of a response letter to the appropriate business partner/customer according to an embodiment of the present invention. For example, if the purchase order was received via a call center, then an exception should trigger a workflow in the call center application to initiate a call to the appropriate business partner/customer according to an embodiment of the present invention. Each of the aforementioned embodiments of the present invention involve content based exception handling. In earlier methods, such exceptions in a business application typically would have triggered a manual workflow to have a customer service representative or the like resolve the issue and trigger an appropriate response.

For example, in a collaboration scenario between a purchaser and a supplier, it can happen that the supplier is unable to fulfill the purchase order in the desired way. Accordingly, the supplier sends back information to the purchaser to inform the purchaser about the changes (e.g., possible delivery date, available quantity, etc.). When the purchaser gets this information, the status of the purchase order is defined and the number of possible reactions may be limited to one of the following: accept the changed purchase order; begin manual activities to obtain a decision or information to support the decision; and/or reject the changes by either canceling the purchase order and creating a new one being sent to an-other supplier (or only changing the source), or canceling the purchase order and informing the requesting entity. Embodiments of the present invention provide an automation of triggering a reaction to an exception occurring in a business application. In an embodiment, the content of the purchase order is analyzed together with the information on which process and which process step in the process chain triggered the exception. This way, a business application can differentiate between the possible reaction types in a flexible way and ensure that whenever possible an automated decision is triggered. Thus, manual intervention will be needed only when no business rule can be derived from the content available from the business object and the process information that led to the exception.

An embodiment of the present invention provides for a central exception handling module which is reusable across any business application, flexible due to use of content dependent rules, and process-oriented due to use of customizing describing end-to-end business processes.

Figure 1:
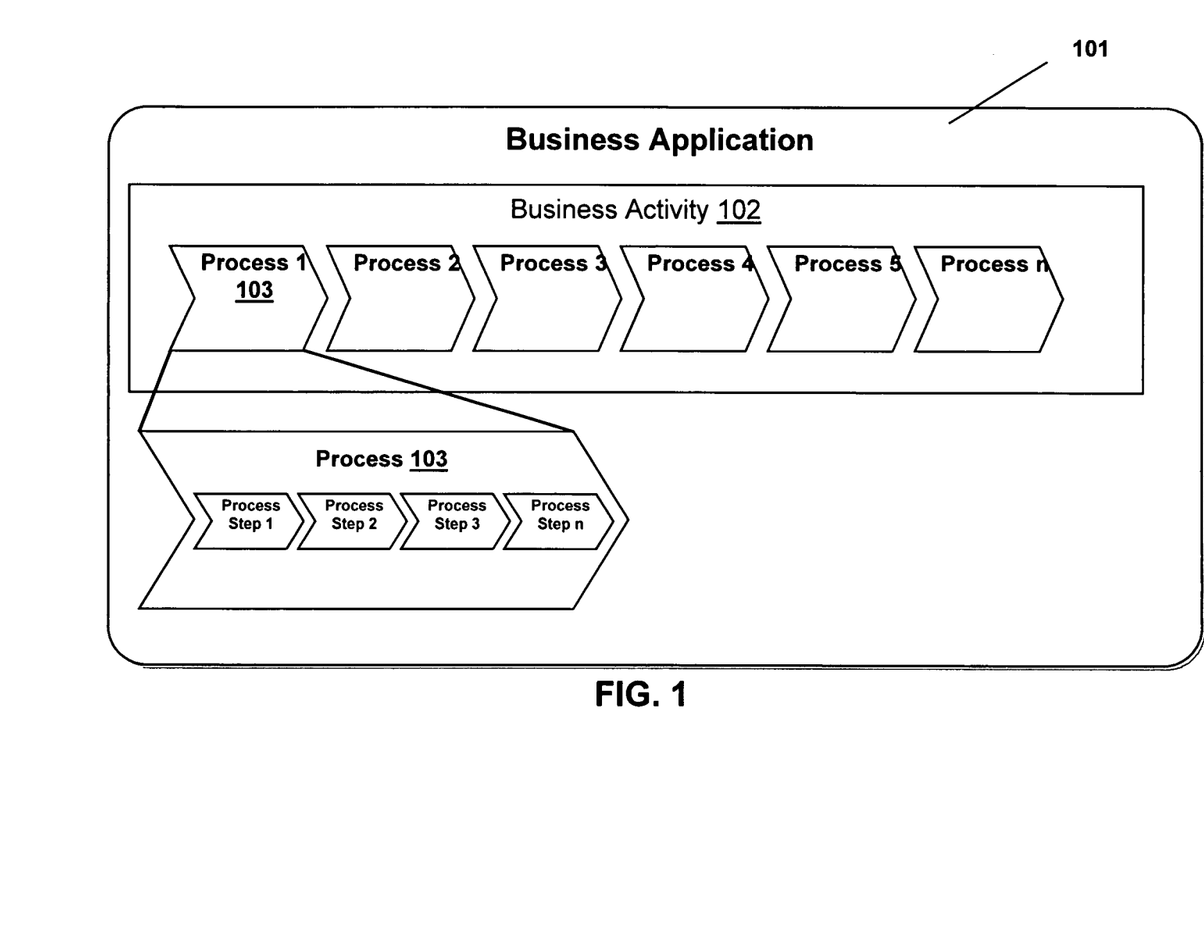
FIG. 1 shows an example embodiment of a business application having a process logic chain.

FIG. 1 shows a breakdown of a business application 101 into business activities 102, processes 103, and process steps 104. Here, a business application 101 refers to a computer-based system that processes business information to support a specific business function. A business application 101 is often implemented as a logical set of business activities on various interrelated business objects. For example, a supplier relationship business application handles all business information about business objects concerning suppliers and purchase orders. Here, a business activity 102 is the business-oriented view on any coordinated set of actions on a certain business object. A business activity 102 on a business object is seen as one working entity, and has well-defined start and end points. A business activity 102 may be comprised of one or more processes 103. For example, the creation of a purchase order involves a software business object PURCHASE_ORDER which includes business activities with several processes such as, for example, "validate order", "apply line item to order", "release order," and "cancel order." Here, software business objects are objects that abstract the entities in the business application.

For example, a purchase order entry program involves concepts such as orders and line items. Each of these concepts may be represented as a business object. A software business object may encapsulate all of the data and behavior associated with the entity that it represents. For example, a purchase order business object may be arranged to have the sole responsibility for loading a purchase order from a database, and exposing or modifying any data associated with that order.

Here, a process 103 is the coordinated flow of process steps. A process 103 may internally use any number of process steps or other processes. A process 103 guarantees the consistent execution of all process steps within the process 103. A process 103 has well defined start and end points. For example, a process related to purchase order processing may be "validate incoming purchase order." This process includes validating all the information on the purchase order like "is the buyer known as a customer", "are all the necessary information available" (invoice number, delivery dates, delivery address, etc.)

In an embodiment of the present invention, a process step is one single action within a process. It has well-defined start and end points. For example, the process step "validate payment terms" in the process "validate incoming purchase order." In each process step, exceptions can occur. For example, in validation process steps certain non-compliant attributes can be identified such as non-existing values or incorrectly filled-in fields or unknown references, e.g., material identifiers unknown by the business application. In an embodiment of the present invention, a business application needs information on which business objects are processed, the processes and process steps, and the possible reaction types in case of exceptions.

Figure 2:
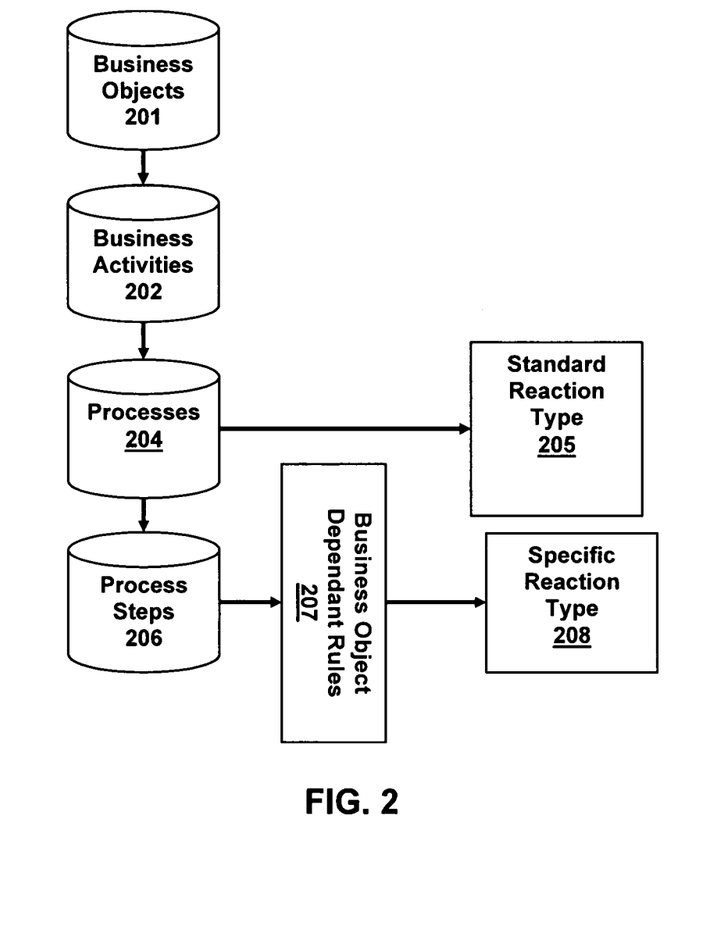
FIG. 2 shows an example embodiment of customizing of information according to the present invention.

FIG. 2 shows a customizing of reaction types. That is, FIG. 2 shows the relationship between the reaction types and the associated exceptions to be stored in order to implement an embodiment of the present invention. A list of the software business objects recognized in the business application is maintained. For each software business object 201, the available attributes (or business attributes) 202 of the business object 201 are defined. These attributes 202 can then be used in the business object dependant rules 207. A list of all business activities that are performed on the defined software business objects is maintained. A list of the processes 204 and/or process steps 205 that are performed for each defined business activity is maintained.

In an embodiment of the present invention, a "Standard Reaction Type" 205 can be linked to each process 204. This means that a specific standard reaction 205 is made valid for all process steps 206 executed within a specific process 204. If no specific reaction type has been specified for a certain process step 206 then the standard reaction type from the process is selected. For each process step, a list of sub-processes performed per process is maintained. In an embodiment, for each process step 206, a rule-set of "Business Object Dependant Rules" 207 that points to a "Specific Reaction Type" 208 for a specific process step can be applied. If a rule fits with the content of the business object, then the specific reaction type is selected. If no specific reaction type has been defined and/or no rule fits to the business object attributes, then the standard reaction type is selected.

Figure 3:
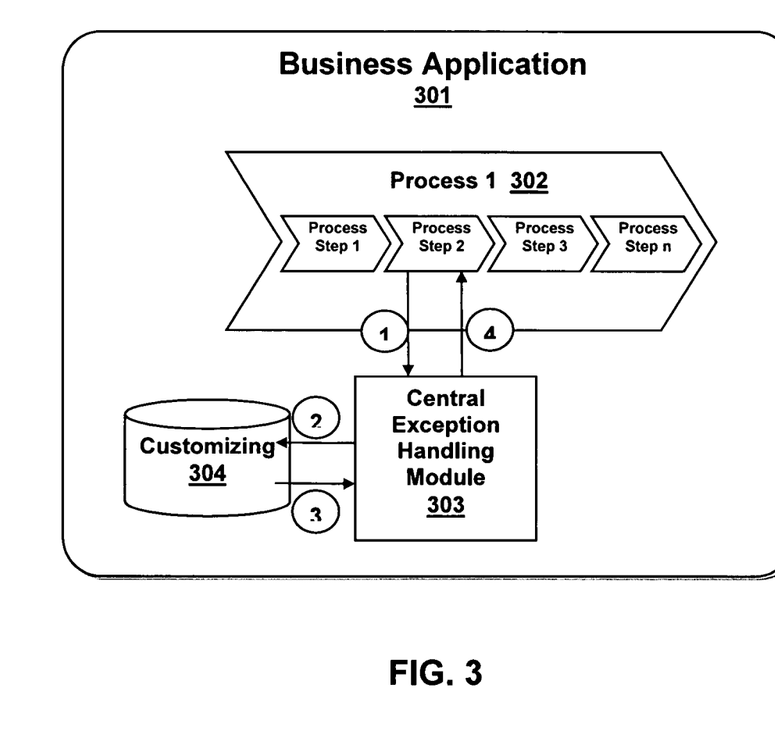
FIG. 3 shows an example embodiment of a business application according to the present invention.

FIG. 3 shows an overview of the components and an example embodiment of their interaction in a business application 301. For example, Process Step 2 within Process 1 302 encounters an exception. Process Step 2 calls a central exception handling module 303 with information. For example, in an embodiment, the information includes at least one of: a. Business Object; b. Business Activity; c. Process; and d. Process Step. The central exception handling module 303 reads the customizing 304 available for the information (here—business object, business activity, process and/or process step). From the customizing look up 304, a reaction type is derived either as a standard reaction type for the Process 1 302 or as a specific reaction type for the specific process step 2. The reaction type value is returned to the calling process step 2. The process step 2 can now react to the exception and trigger the optimal exception handling.

Figure 4:
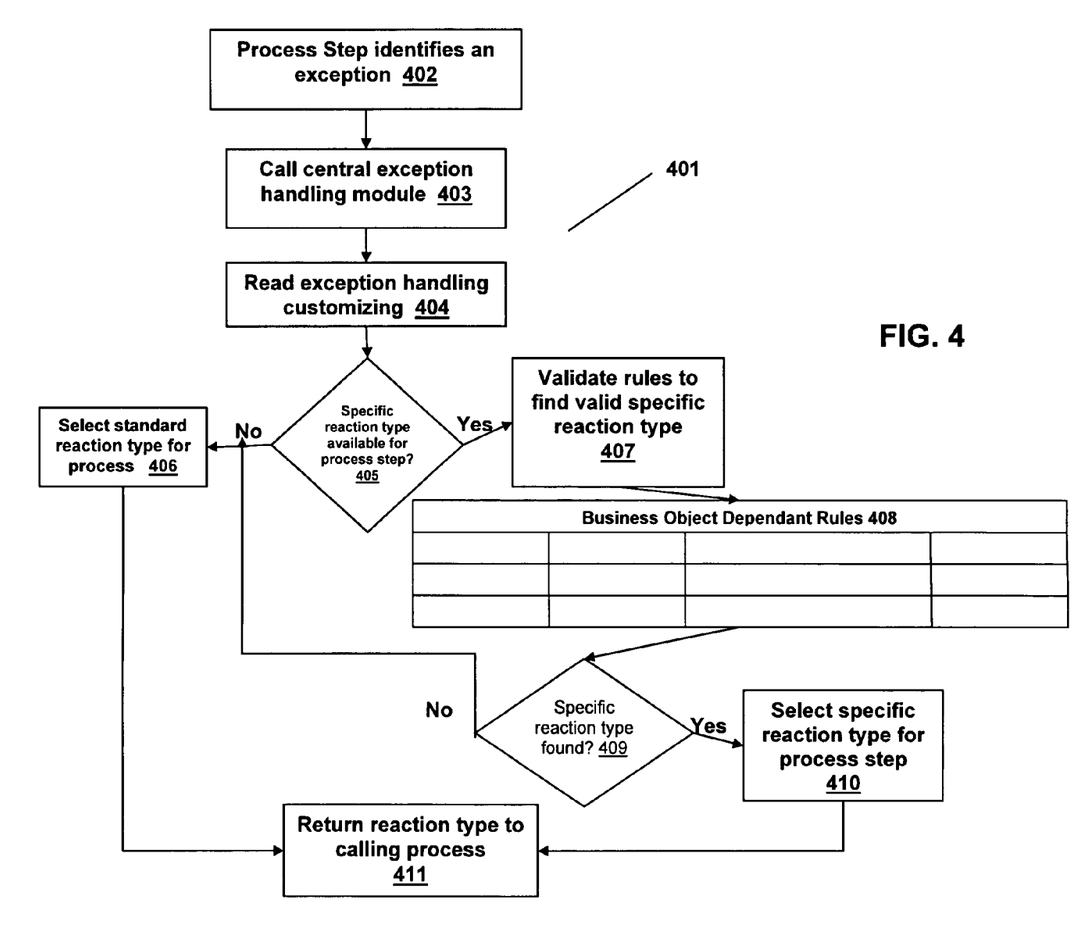
FIG. 4 shows a flow chart illustrating an example embodiment method according to the present invention.

FIG. 4 shows an detailed overview 401 of the components and an example embodiment of their interaction in a business application. For example, in a situation where a process step identifies an exception 402, the process step calls the central exception handling module 403. The module then reads 404 the exception handling customizing information stored, for example, in a database(s) or table(s). It is then determined whether a specific reaction type is available for the process step. If a specific reaction type is available, then the rule(s) is validated 407 to find a valid specific reaction type. For the process step, a rule-set of Business Object Dependant Rules 408 is reviewed. If a rule in the Business Object Dependent Rules 408 points to a specific reaction type 409 and fits with the content of the business object, then the specific reaction type is selected 410. If no specific reaction type has been defined and/or no rule fits to the business object attributes, then the standard reaction type is selected 406. After selection of the specific and/or standard reaction type, then the respective reaction type may be returned to the calling process 411.

For the various embodiments of the present invention, e.g., that shown in FIG. 4, the business application may concern, for example, Supplier Relationship Management (SRM). In this example, the software business object is "purchase order." The attributes of the software business object "purchase order" can include: order date, sold to party, ship to party, requested delivery date, valid from date, valid to date, total weight, total amount, currency, payment terms, delivery status, and/or sales channel, among various other possible attributes. For example, a sales channel attribute may include various types such as Internet, order received via paper based media (letter/facsimile/email), and call center. In this example, the process may involve validating an incoming purchase order. The process steps included in such process may include: validate "Sold to Party," validate "Payment Terms," validate "Requested Delivery Date," and validate "Total Amount," and set "Delivery Status." There are several questions that the system may be able to answer, including whether the customer is known as business partner in the system; are the payment terms stated in the purchase order valid according to the known payment terms in the system; is the date valid according to a calendar; is the date a working day; is the total amount correct calculated? A Business Object Dependent Rules database has, e.g., a Standard Reaction Type entry for Process "Validate Incoming purchase order" for which the associated rule(s) is: S001 Trigger manual workflow to correct issue with order. For example, special reaction types for Process Step 2 (Validate Payment Terms) includes the following:

| Reaction Type | Description |
| --- | --- |
| 001 | Cash up front + shipping costs |
| 002 | Invoice date + 30 days, no shipping costs |
| 003 | Invoice date + 8 days + shipping costs |
| 004 | Invoice date + 60 days, no shipping cost |
| 005 | Forward to manual maintenance of payment terms |

The standard reaction to any validation error within the process of validating incoming purchase orders would be to trigger a manual workflow to correct the issue. This means manual involvement and the costs of the labor force performing this task(s). As discussed herein, embodiments of the present invention enable a company using an SRM or other business application to differentiate the exception handling and to automate it as much as possible by allowing flexible business rules to prevent the automatic default need for several types of tasks to be performed manually.

Figure 5:
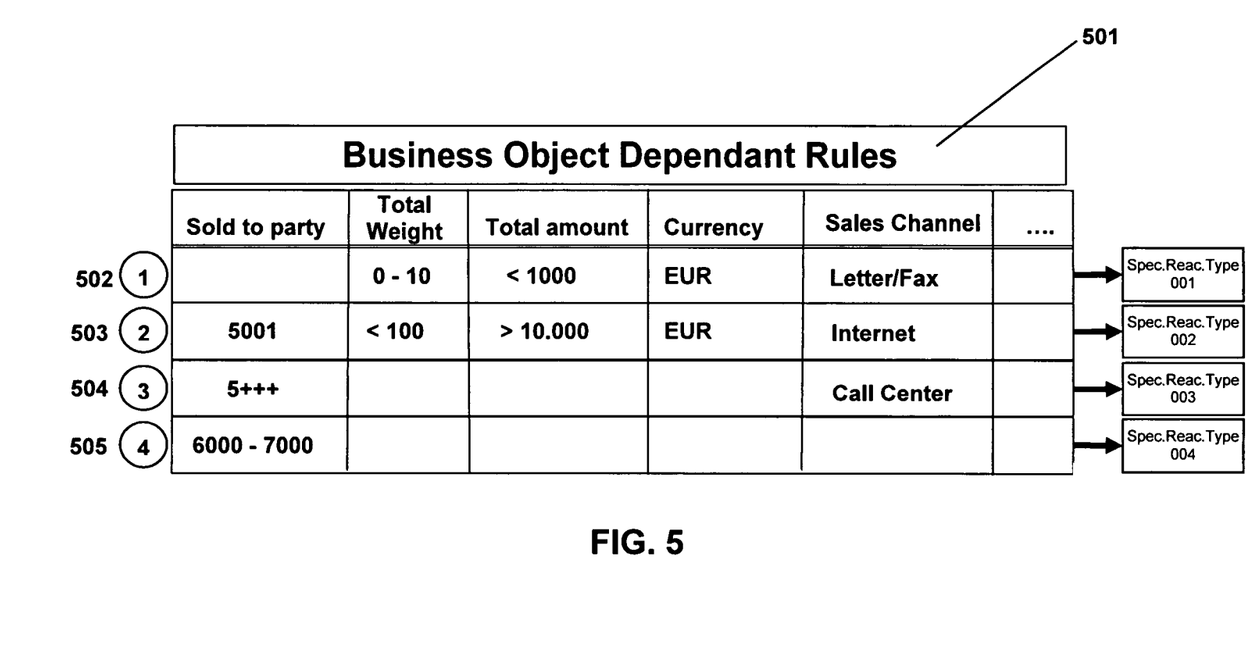
FIG. 5 shows an example embodiment of a table having business object dependent rules according to the present invention.

FIG. 5 shows an example of business object dependant rules 501 for the process step 2 (e.g., Validate Payment Terms). Special reaction types are also provided here. In entry 1 (502), all orders with a "total weight" between 0 to 10 kg and a "Total amount"<1000 and "Currency"=EU and "Sales Channel"=Letter/Fax are associated with Special Reaction Type 001. For example, for small orders that are sent to the company via letter/fax, the payment terms are automatically set to "cash up front+shipping costs" in case of an validation error. This prevents manual intervention and ensures the automated further processing. In entry 2 (503), the specific business partner with 'Sold to party" is identified as 5001, with a "Total Weight" of less than 100 kg, a "Total amount" of greater than 10,000, "Currency" being in Euro units, and "Sales Channel" being the Internet, is associated with Special Reaction Type 002. For example, if an error in an order from a certain customer (ID=5001) is found, this rule ensures that this customer's special agreement of not paying any shipping costs for large orders with a relatively low weight initiated via the Internet is automatically applied to the order. This rule prevents manual intervention and ensures the automated further processing. In entry 3 (504), every "Sold to party" having an identifier starting with "5" in the first digit and "Sales Channel" being the Call Center is associated with Special Reaction Type 003. For example, for a specific customer group identified by the first digit of the customer identification (ID) (here=5) using the call center to initiate orders, a specific payment term (here, that associated with Special Reaction Type 003) is automatically applied should any exceptions be discovered in the validation. In entry 4 (505), "Sold to party" with an ID between 6000 and 7000 is associated with Special Reaction Type 004. For example, for a specific customer group identified by the customer ID (here, 6000-7000) in the application, a specific payment term (here, that associated with Special Reaction Type 004) is automatically applied should any exceptions be discovered. In this example, other information such as total weight, amount, currency, sales channel, etc. are not provided. Accordingly, the only information of interest for the Special Reaction Type 004 to apply is to a customer having an identifier in the group 6000 to 7000.

In an embodiment, in other exception cases—outside of the special reaction details—the standard reaction type is triggered. Such a standard reaction type may be set to result in a manual workflow so that an employee clarifies the issue with, e.g., the payment term. Some embodiments herein have been described within an ERP business application. However, embodiments of the present invention may be used and implemented in any kind of software business application.

Further, in embodiments herein, a processor is used for implementation. Such processor or computing device may be at least one of a distribution server, an installation server, a computer, a handheld computing device, a medium, a network site, multiple computing resources, a DVD, a CDROM, and a flash memory.

Software applications, or programs, may be stored in a business system, for example, a legacy software system. The software applications may be stored, for example, in a distribution server in communication with other servers and workstations/computer processors in the business system. The applications may be stored and/or accessed using various storage devices and computer systems available. An administrator or other authorized user may access the software applications in the business system.

The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored in a machine readable medium and/or transmitted by a data signal embodied in a carrier waive over a transmission medium or a communication link. The "machine readable medium" may include any medium that can store and/or transfer information. Examples of a machine readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as Internet, Intranet, etc.

Although the invention has been described above with reference to specific embodiments, the invention is not limited to the above embodiments and the configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. The present embodiments are therefore to be considered in all respects as illustrative and not restrictive. The scope of the invention is indicated by appended claims rather than by foregoing description, and all changes that come within the meaning and range of equivalency of the claims are therefore intended to be embraced therein.

What is claimed is:

1. A processor-implemented method for object-oriented content based exception handling in a business software application, comprising:
   providing a business software object with an associated business activity, the associated business activity including at least one business process step in a process chain in the business software application;
      providing a database including at least one business rule associated with at least one response type, wherein the at least one business rule defines value ranges for at least one of order date, sold to party, ship to party, requested delivery date, valid from date, valid to date, total weight, total amount, currency, payment terms, delivery status, and sales channel;
   identifying that a business exception occurred in the at least one business process step; and
   upon identifying the business exception occurred in the at least one business process step, then analyzing the context of the at least one business process step within the process chain and at least one business rule specific to the at least one business process step, wherein the at least one business rule specific to the at least one business process step defines value ranges for at least two of order date, sold to party, ship to party, requested delivery date, valid from date, valid to date, total weight, total amount, currency, payment terms, delivery status, and sales channel, and wherein analyzing the at least one business rule includes:
      determining whether the at least one business rule specific to the at least one business process step matches the at least one business rule in the database based on whether for each business rule specific to the at least one business process step:
         at least two columns of the each business rule specific to the at least one business process step fall within a value range specified in each respective column of at least one corresponding business rule in the database, and one of:
            if only one corresponding business rule exists in the database, identifying the corresponding business rule as a matched business rule, and
            if a plurality of corresponding business rules exist in the database, identifying a single business rule having a largest number of populated columns from the plurality of corresponding business rules in the database as a matched business rule, and
      upon determination of a match, executing at least one response type associated with the respective matched at least one business rule in the database.

2. The method of claim 1, further comprising:
   if a match is not determined, then executing a predetermined default response type.

3. The method of claim 2, wherein the predetermined default response type includes generating a workflow for manual response.

4. The method of claim 1, further comprising:
   accessing the database as a central overview of exceptions and associated reactions.

5. The method of claim 1, further comprising:
   upon identifying the exception occurred, calling a central exception handling module; and reading an exception handling customizing, wherein the exception handling customizing includes the database.

6. The method of claim 1, wherein the specific process step in the process chain indicates a level of order of process steps in the process chain.

7. The method of claim 1, wherein the business software application is a part of an Enterprise Resources Planning system.

8. The method of claim 1, wherein the at least one business rule includes contextual information associated with the process step, the contextual information being at least one of: a transmission channel use indication, a customer identifier, a purchase identifier, goods information, regulation information, and shipping information.

9. A system for object-oriented content based exception handling in a business software application, comprising:
   a database;
   a processor for executing computer instructions, the computer instructions comprising:
   a business software object;
   a business activity associated with the business software object, the associated business activity including at least one business process step in a process chain in the business software application;
      the database including at least one business rule associated with at least one response type, wherein the at least one business rule defines value ranges for at least one of order date, sold to party, ship to party, requested delivery date, valid from date, valid to date, total weight, total amount, currency, payment terms, delivery status, and sales channel, wherein if a business exception occurs in the at least one business process step, then the context of the at least one business process step within the process chain is analyzed and at least one business rule specific to the at least one business process step is analyzed, wherein the at least one business rule specific to the at least one business process step defines value ranges for at least two of order date, sold to party, ship to party, requested delivery date, valid from date, valid to date, total weight, total amount, currency, payment terms, delivery status, and sales channel, and wherein analysis of the at least one business rule includes:
determining whether the at least one business rule specific to the at least one business process step matches the at least one business rule in the database based on whether for each business rule specific to the at least one business process step:
at least two columns of the each business rule specific to the at least one business process step fall within a value range specified in each respective column of at least one corresponding business rule in the database, and one of:
if only one corresponding business rule exists in the database, identifying the corresponding business rule as a matched business rule, and
if a plurality of corresponding business rules exist in the database, identifying a single business rule having a largest number of populated columns from the plurality of corresponding business rules in the database as a matched business rule, and
upon determination of a match, executing at least one response type associated with the respective matched at least one business rule in the database.

10. The system of claim 9, wherein if a match is not determined, then executing a predetermined default response type.

11. The system of claim 10, wherein the predetermined default response type includes generating a workflow for manual response.

12. The system of claim 9, wherein the database is accessible as a central overview of exceptions and associated reactions.

13. The system of claim 9, wherein upon identifying the exception occurred, calling a central exception handling module; and reading an exception handling customizing module, wherein the exception handling customizing module includes the database.

14. The system of claim 9, wherein the specific process step in the process chain indicates a level of order of process steps in the process chain.

15. The system of claim 9, wherein the business software application is a part of an Enterprise Resources Planning system.

16. The system of claim 9, wherein the at least one business rule includes contextual information associated with the process step, the contextual information being at least one of: a transmission channel use indication, a customer identifier, a purchase identifier, goods information, regulation information, and shipping information.

17. A non-transitory computer readable medium having instructions thereon for implementing a method for object-oriented content based exception handling in a business software application, comprising:
providing a business software object with an associated business activity, the associated business activity including at least one business process step in a process chain in the business software application;
providing a database including at least one business rule associated with at least one response type, wherein the at least one business rule defines value ranges for at least one of order date, sold to party, ship to party, requested delivery date, valid from date, valid to date, total weight, total amount, currency, payment terms, delivery status, and sales channel;
identifying that a business exception occurred in the at least one business process step; and
upon identifying the business exception occurred in the at least one business process step, then analyzing the context of the at least one business process step within the process chain and at least one business rule specific to the at least one business process step, wherein the at least one business rule specific to the at least one business process step defines value ranges for at least two of order date, sold to party, ship to party, requested delivery date, valid from date, valid to date, total weight, total amount, currency, payment terms, delivery status, and sales channel, and wherein analyzing the at least one business rule includes:
determining whether the at least one business rule specific to the at least one business process step matches the at least one business rule in the database based on whether for each business rule specific to the at least one business process step:
at least two columns of the each business rule specific to the at least one business process step fall within a value range specified in each respective column of at least one corresponding business rule in the database, and one of:
if only one corresponding business rule exists in the database, identifying the corresponding business rule as a matched business rule, and
if a plurality of corresponding business rules exist in the database, identifying a single business rule having a largest number of populated columns from the plurality of corresponding business rules in the database as a matched business rule, and
upon determination of a match, executing at least one response type associated with the respective matched at least one business rule in the database, and if no match is determined, then executing a predetermined default response type.

18. The non-transitory computer-readable medium of claim 17, wherein the predetermined default response type includes generating a request for a manual response.

* * * * *